Patented Aug. 19, 1924.

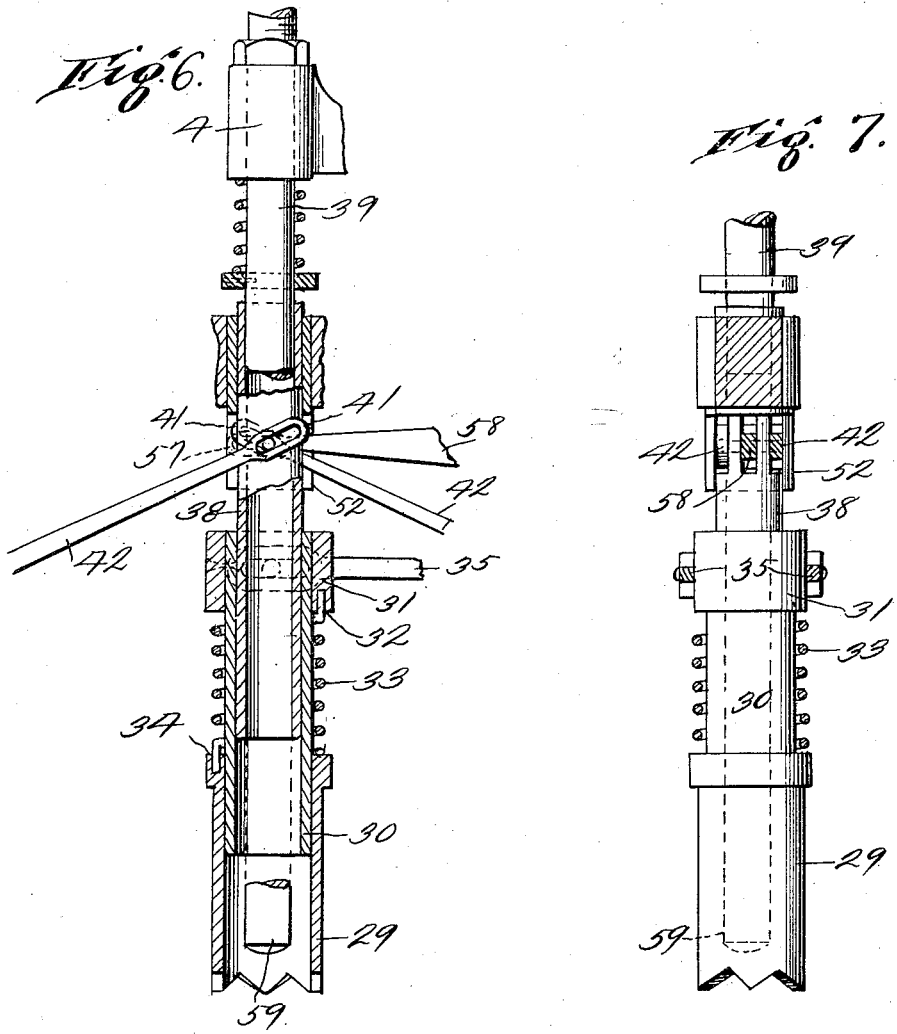

1,505,488

UNITED STATES PATENT OFFICE.

IGNAZIO PIERMATTEI, OF LANDISVILLE, NEW JERSEY.

PEACH CUTTING AND PITTING MACHINE.

Application filed April 24, 1924. Serial No. 708,689.

*To all whom it may concern:*

Be it known that I, IGNAZIO PIERMATTEI, a citizen of the United States, residing at Landisville, in the county of Atlantic, State of New Jersey, have invented a new and useful Peach Cutting and Pitting Machine; and I do hereby declare the following to be a full, clear, and exact description of the invention, such as will enable others skilled in the art to which it appertains to make and use the same.

The invention relates to peach cutting and pitting machines, and has for its object to provide a device of this character whereby a peach may be easily and quickly severed, pitted and the severed parts spread apart, and then conveyed to a receptacle.

A further object is to provide the machine with vertically disposed pit gripping shafts, which shafts are cam and lever operated for gripping the peach upon the initial operation, and cam and lever operating knives for severing the peach at opposite sides after the gripping operation. Also to provide knives formed in two registering sections and means for spreading said knives at the end of the cutting operation, thereby forcing the peach sections away from the pit.

A further object is to yieldably mount one of the pit gripping members, thereby allowing the device to accommodate itself to variations in size of pits.

A further object is to provide an endless belt conveyor for conveying peaches to the machine, and for conveying peach stones to a receptacle at one side of the machine.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 6 is a vertical sectional view through the upper pit gripping member and the operating mechanism therefor.

Figure 7 is a side elevation of the peach gripping member shown in Figure 6 and adjacent mechanism.

Figure 1:
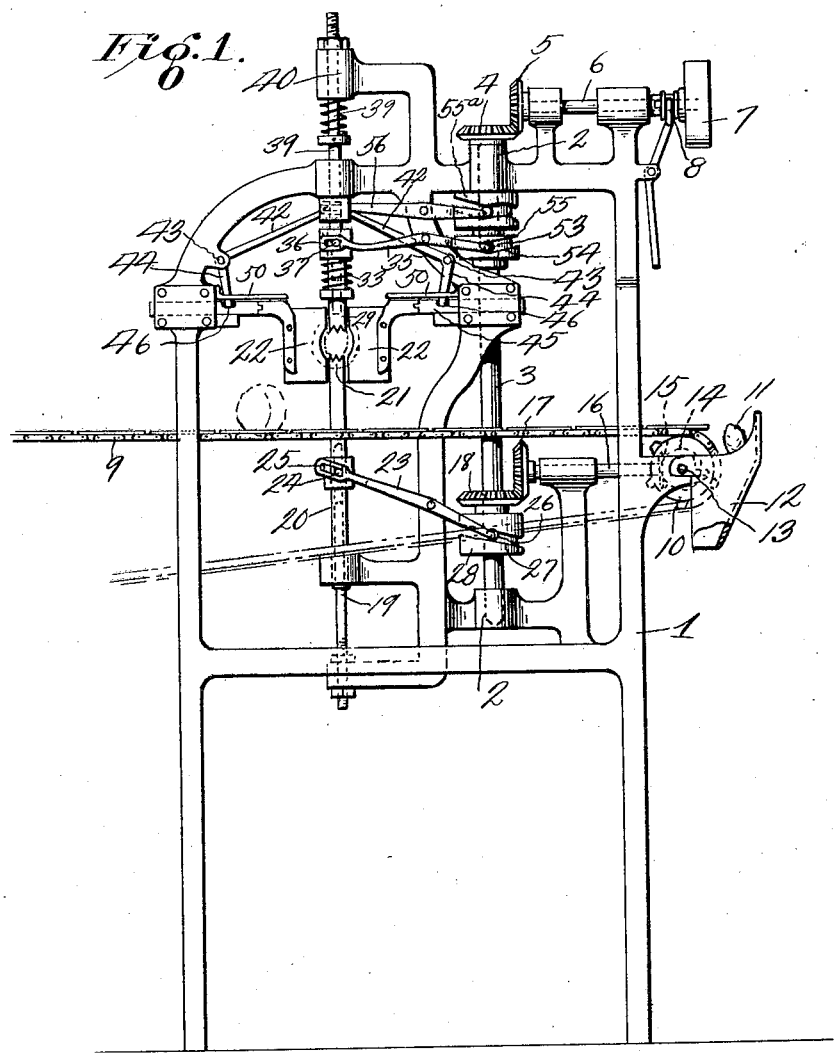
Figure 1 is a front elevation of the peach cutting and pitting machine.

Referring to the drawing, the numeral 1 designates the frame of the machine, in bearings 2 of which is rotatably mounted a vertically disposed shaft 3. The upper end of the shaft 3 is provided with a bevelled gear 4, with which the bevelled gear 5 carried by the horizontally disposed drive shaft 6 meshes. Drive shaft 6 may be driven in any suitable manner, however for purposes of illustration is provided with a pulley, through which may be belted any suitable kind of engine, and with which any kind of conventional form of clutch 8, whereby the rotation of the shaft 6 may be controlled in relation to the drive pulley 7. Extending through the frame 1 is an endless conveyor 9, on which peaches may be placed for conveying the peaches to a position adjacent the pitting and cutting mechanism hereinafter set forth. The conveyor 9 extends over sprockets 10, at one side of the frame 1, and is adapted to convey pits 11 after they have been removed from the peaches to a discharge chute 12, into which they are discharged by the conveyor, said chute may have disposed thereunder a receptacle into which the pits are discharged and collected. Sprockets 10 are mounted on a transversely disposed shaft 13, and which shaft is provided with a bevelled gear 14, which meshes with a bevelled gear 15 carried by a shaft 16. The inner end of the shaft 16 is provided with a bevelled gear 17, which meshes with a bevelled gear 18 of the vertically disposed shaft 3, therefore it will be seen that during the rotation of the vertically disposed shaft 3, the endless conveyor 9 will be operated, and consequently the conveyor will operate all the time when the machine as a whole is in operation.

Figure 2:
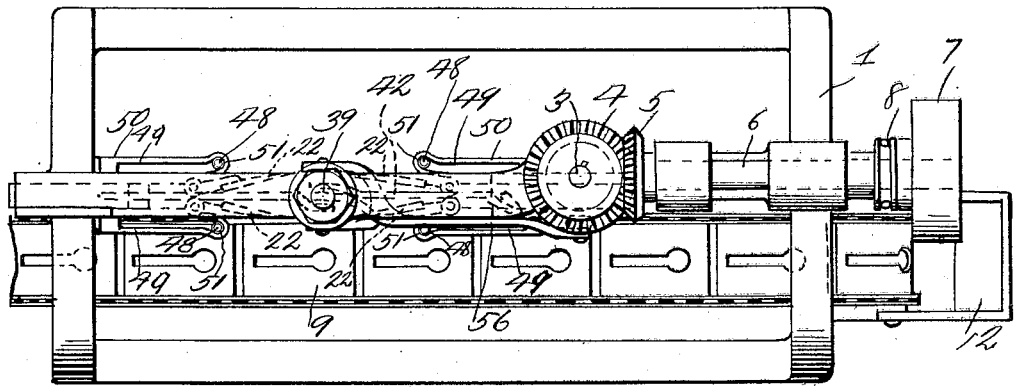
Figure 2 is a top plan view of the machine.
Figures 3, 5:
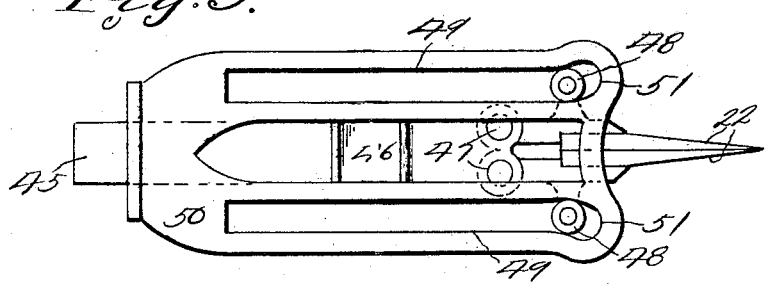
Figure 3 is a top plan view of one of the knives and the spreading means therefor.
Figure 5 is an end view of one of the pit gripping members.
Figure 4:
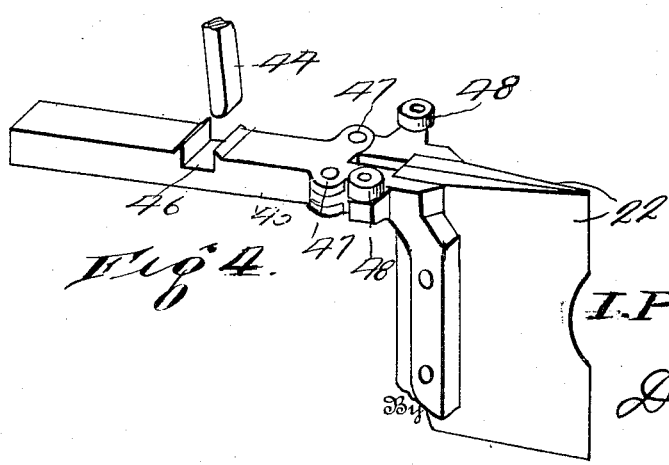
Figure 4 is a perspective view of one of the knives.

Slidably mounted on a vertically disposed rod 19 is a peach holder sleeve 20, the upper end of which is provided with teeth 21, adapted to pierce the under side of the peach and engage the pit therein, and at the same time move the peach upwardly to a position between the horizontally movable severing knives 22, therefore it will be seen that the operator's hand at no time is placed between the knives. Sleeve 20 is rocked by means of a rock lever 23, one end of which is connected to the sleeve by means of a pin 24 disposed in a slot 25 of the lever, and the other end of which lever is provided with a roller 26 disposed in a cam slot 27 of a cam block 28 mounted on the shaft 3, therefore it will be seen that during the rotation of the shaft, the sleeve 20 will be moved upwardly for positioning a peach between the knives 22, and will also be moved downwardly after the severing operation. Rod 19 not only guides the sleeve 20, but forms means for knocking the peach seed from the toothed end of the sleeve if the same should become impaled thereon. It is obvious that peaches and their pits vary in size, consequently it is necessary to provide yielding means for gripping the peach pit. To accomplish this result the upper peach holder 29 is slidably mounted on a sleeve 30, which sleeve is provided with a collar 31, to which is connected at 32 a coiled spring 33. The lower end of the spring 33 is in turn connected at 34 to the upper end of the peach holder sleeve 29, therefore it will be seen that the peach holder sleeve 29 is yieldably mounted, and consequently when the pivoted rock arm 35 is forced downwardly, its slotted end 36 has disposed therein the pin 37 carried by the upper end of the sleeve 30, the peach holding sleeve 29 will be forced downwardly to a position where it will be engaged by the peach as it is raised by the lower peach holder; and by providing the yielding means 33 peaches having pits of various sizes will be gripped and held irrespective of the necessary uniform stroke of the rock lever 35. Slidably mounted within the sleeve 30 is a sleeve 38, which sleeve is in turn slidably mounted on a knock out rod 39 carried by the bracket 40 of the frame. Sleeve 38 has connected thereto slotted ends 41 of bell crank levers 42, and which bell crank levers are pivotally mounted at 43 on the frame and have downwardly extending arms 44, which arms, when the slotted ends of the arms are pulled upwardly as shown in Figure 1, move the knife bars 45, in slots 46 of which they engage inwardly towards each other, thereby moving the knife blades 22 towards each other for severing the peach which has been previously gripped by the holding members 21 and 29. When the knives 22 approach the end of their stroke inwardly, said knives 22, which are hingedly mounted at 47 are forced outwardly or spread in opposite directions, thereby pulling the opposite sections of the peach which have been previously cut apart, and away from the pit, which is held by the pit holding means. The severing blades 22 are forced apart by means of rollers 48 which are in the parallel guide slots 49 of the guide bar 50 during the peach severing operation entering the diverging portions 51 of said slots 49 at the end of the stroke. Upon the return movement of the knife bars 45, the rollers 48 again enter the slots 49 and close the knives 22 to the position shown in Figures 2 and 4. Bell crank levers 42 have arms connected to the sleeve 38 as clearly shown in Figures 6 and 7, therefore it will be seen that when the peach is gripped by the upper member 29 after being raised to a position between the knives, that a further upward movement thereof will force upwardly the sleeves 38, which will engage the collar 52, consequently the bell crank levers 42 are rocked on their pivotal point and the arms 44 will move inwardly for moving the knives 22 towards each other. Lever 35 which controls the upward movement of the sleeve 30, has one of its ends provided with a roller 53, which is disposed in a cam slot 54 of a cam member 55 on the shaft 3, and consequently the time of rocking thereof may be varied as desired according to the shape of the cam slot. Mounted on the shaft 3 is a cam slot member 55$^a$, which cooperates with a rock lever 56, one end of which is provided with a slot 57, which has slidably mounted therein the pin 58 of the knock out rod 39, and which knock out rod is held against movement upon extreme upward movement of the sleeve 30 immediately after the peach separating operation, therefore it will be seen that the lower end 59 of said rod will engage a peach pit which may be impinged on the holding member 29 and dislodge the same.

From the above it will be seen that a peach pitting and severing machine is provided whereby a peach is gripped, moved to a position between severing blades and the severing blades moved into severing engagement at opposite sides of the peach, after which the blades are forced apart while in the opposite sides of the peach for tearing the sides of the peach away from the pit which is being held. It will also be seen that all of the mechanism for holding and severing the peach is controlled by means of cam slots on a single shaft, and which cam slots control rock levers, therefore it will be seen that the operation is a positive one, the device simple in construction and yieldable means is provided in connection therewith whereby the pit gripping mechanism will automatically accommodate itself to pits of different size, without modifying the operation of any of the rock levers.

The invention having been set forth what is claimed as new and useful is:—

1. A peach severing device comprising vertically movable cooperating pit gripping members, oppositely disposed horizontally movable severing knives, means for moving said knives towards each other into opposite sides of a peach, and means for spreading said knives when they reach the end of their inward movement and means for restoring the gripping members to normal position.

2. A peach severing device comprising vertically movable cooperating pit gripping members, one of said members being yieldably mounted, cam and lever means for moving said gripping members upwardly, horizontally disposed pairs of spreadable knives at opposite sides of the gripping members and above the normal position of the lower gripping member, cam and lever controlled means for moving the pairs of knives inwardly for severing the peach, means cooperating with said pairs of knives for spreading said knives at the inner ends of their stroke, said last named cam and lever means also forming means for returning the knives to normal positions and lowering the gripping members to normal position.

3. The combination with a peach gripping and severing device, said device comprising vertically movable gripping members, of knives disposed above the lower gripping member and horizontally movable towards and away from each other, said knives comprising knife bars, blades pivotally connected to the knife bars, rollers carried by said blades, said rollers cooperating with cams whereby the knives will be normally maintained in engagement with each other and spread apart as they approach the ends of their inward movement.

4. The combination with a peach gripping and severing device, said device comprising vertically movable pit gripping members adapted to grip opposite sides of a pit, means for moving said members simultaneously upwardly, oppositely disposed severing knives, said severing knives comprising hingedly mounted blades normally in engagement with each other, of means cooperating with said knives for moving the same simultaneously inwardly towards each other, cams having cam slots, said blades being provided with members cooperating with the cam slots of the cams whereby said blades during their inward movement will be in engagement with each other, and when they reach the inner ends of the slots will be spread apart, said spreading means also forming means whereby upon an outward movement of the knives, said blades will be moved into engagement with each other.

5. A peach severing device comprising peach gripping members, yieldable means carried by said members whereby peaches of different size may be held thereby, means cooperating with said gripping members whereby said gripping members will be moved towards and away from each other, horizontally movable severing knives, said severing knives comprising pairs of hingedly mounted blades, means for moving said knives towards the peach held by the gripping members and spreading said knives after the severing operation, means for moving said knives outwardly and closing the blades, and knock out means cooperating with the gripping members pits which may become impaled thereon will be dislodged.

6. The combination with a peach gripping, severing and separating machine, said machine comprising pit gripping members, spreadable severing knives movable towards and away from said peach, of lever means cooperating with the knives for controlling the knives, said lever means being controlled by the peach gripping members, an operating shaft, members having cam slots mounted on said operating shaft, rock levers, said rock levers being connected to the gripping members and controlled by the cam slots of the members mounted on the operating shaft.

7. The combination with a peach severing device comprising horizontally movable severing and spreading members, vertically movable peach gripping members, one of said members being normally disposed below the knives and movable to a position between the knives, of an endless belt conveyor adjacent the lower gripping member and forming means whereby peaches may be conveyed to a position adjacent the lower gripping member before said gripping member moves upwardly to a position between the knives.

In testimony whereof I have signed my name to this specification in the presence of two subscribing witnesses.

IGNAZIO PIERMATTEI.

Witnesses:
J. M. CAMP,
A. K. BOWLES, Jr.